United States Patent
Ramachandra et al.

(10) Patent No.: US 11,385,072 B2
(45) Date of Patent: Jul. 12, 2022

(54) ENGINE RELIGHT VISUALIZATION METHODS AND SYSTEMS

(71) Applicant: HONEYWELL INTERNATIONAL INC., Morris Plains, NJ (US)

(72) Inventors: Sripathi Ramachandra, Bengaluru (IN); Greg Carlucci, Phoenix, AZ (US); Karel Mundel, Vrane nad Vltavou (CZ); Richard Snyder, Phoenix, AZ (US); Mark Pearson, Peoria, AZ (US); Udipi Ranga Ananthram, Bangalore (IN); PraveenKumar Ayyathurai, Pollachi (IN); Samrat Kar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 262 days.

(21) Appl. No.: 16/512,151

(22) Filed: Jul. 15, 2019

(65) Prior Publication Data

US 2021/0018333 A1  Jan. 21, 2021

(51) Int. Cl.
*G01C 23/00* (2006.01)
*G06F 3/0484* (2022.01)
(Continued)

(52) U.S. Cl.
CPC ............. *G01C 23/00* (2013.01); *B64D 43/02* (2013.01); *G06F 3/04847* (2013.01); *G06F 3/14* (2013.01); *G06F 3/0482* (2013.01)

(58) Field of Classification Search
CPC ..... G01C 23/00; B64D 43/02; G06F 3/04847; G06F 3/14; G06F 3/0482
See application file for complete search history.

(56) References Cited

U.S. PATENT DOCUMENTS 5,129,221 A   7/1992  Walker et al.
8,403,258 B2  3/2013  Arendt et al.
(Continued)

FOREIGN PATENT DOCUMENTS

GB  2422875 A      8/2006
JP  2001295669 A  10/2001
WO  2007001366 A2  1/2007

OTHER PUBLICATIONS

Zachos, P.K.; Gas Turbine Sub-idle Performance Modelling; Altitude Relight and Windmilling; School of Engineering Department of Power and Propulsion; Feb. 2010.

*Primary Examiner* — Tadesse Hailu
*Assistant Examiner* — Darrin Hope
(74) *Attorney, Agent, or Firm* — Lorenz & Kopf, LLP

(57) ABSTRACT

Methods and systems are provided for presenting an energy state associated with an aircraft with respect to an operating envelope region for a procedure to restart an engine of the aircraft. One method involves providing a graphical user interface display having a first reference axis corresponding to a first energy state parameter and a second reference axis corresponding to a second energy state parameter different from the first energy state parameter, providing a graphical representation of an operating envelope region associated with a procedure for starting an engine of the aircraft with respect to the first and second reference axes, obtaining current values for the first and second energy state parameters for the aircraft, and providing a graphical representation of the aircraft positioned with respect to the first and second reference axes based on the current values for the first and second energy state parameters.

20 Claims, 7 Drawing Sheets

(51) Int. Cl.
    *G06F 3/14*           (2006.01)
    *B64D 43/02*        (2006.01)
    *G06F 3/04847*     (2022.01)
    *G06F 3/0482*      (2013.01)

(56) References Cited

U.S. PATENT DOCUMENTS

| | | |
|---|---|---|
| 9,045,018 B2 | 6/2015 | Swanson |
| 9,567,099 B2 | 2/2017 | Poux et al. |
| 2006/0168968 A1* | 8/2006 | Zielinski ................. F02C 7/275 |
| | | 60/778 |
| 2009/0235638 A1 | 9/2009 | Jain et al. |
| 2014/0121863 A1 | 5/2014 | Barraci |
| 2016/0085239 A1* | 3/2016 | Boyer .................... G08G 5/025 |
| | | 701/5 |
| 2016/0356280 A1 | 12/2016 | Pascu et al. |

\* cited by examiner

ENGINE RELIGHT VISUALIZATION METHODS AND SYSTEMS

TECHNICAL FIELD

The subject matter described herein relates generally to aircraft systems, and more particularly, embodiments of the subject matter relate to aircraft systems capable of facilitating an engine restart by displaying the aircraft energy state with respect to operating envelope regions for different relight procedures.

BACKGROUND

Jet engines are common in modern aircraft due to their advantages at higher speeds and altitudes. Due to any number of factors, in rare situations, jet engines are susceptible to flame out and a corresponding loss of thrust during flight. Most modern aircraft have the capability to restart or "relight" the jet engine while in flight; however, the capability and corresponding procedure for doing so is often constrained to particular operating regions or envelopes. Original equipment manufacturers (OEMs) typically provide reference data that outlines the recommended operating regions or envelopes for different procedures that may be utilized to restart the engine. However, since the aircraft's speed and altitude are dynamically changing during flight, along with dynamic weather conditions, air traffic, and airspace restrictions, it can be difficult for a pilot to ascertain what restart procedures are or will be available and determine the safest or optimal manner for restarting the engines, particularly during inclement weather or other operational conditions that can also often be the underlying cause or factor in the flame out. Accordingly, it is desirable to provide aircraft systems and methods for reducing the cognitive workload on a pilot deciding on the manner of restarting the engine. Other desirable features and characteristics of the methods and systems will become apparent from the subsequent detailed description and the appended claims, taken in conjunction with the accompanying drawings and the preceding background.

BRIEF SUMMARY

Methods and systems are provided for displaying an aircraft energy state with respect to operating envelope regions for different relight procedures. One exemplary method of presenting an energy state associated with an aircraft on a graphical user interface display involves providing, on a display device onboard the aircraft, the graphical user interface display comprising a first reference axis corresponding to a first energy state parameter and a second reference axis corresponding to a second energy state parameter different from the first energy state parameter, providing, on the graphical user interface display, a graphical representation of an operating envelope region associated with a procedure for starting an engine of the aircraft with respect to the first and second reference axes, obtaining, from one or more systems onboard the aircraft, current values for the first and second energy state parameters for the aircraft, and providing, on the graphical user interface display, a graphical representation of the aircraft positioned with respect to the first and second reference axes based on the current values for the first and second energy state parameters. In this regard, the position of the graphical representation of the aircraft may be dynamically updated with respect to the first and second reference axes in response to changes to the current values for the first and second energy state parameters.

In another embodiment, an aircraft system is provided that includes one or more onboard systems to provide current parameter values associated with a current energy state of an aircraft, a data storage element to maintain information defining an operating envelope region for a starting procedure for an engine of the aircraft, a display device, and a processing system coupled to the one or more onboard systems, the data storage element, and the display device to provide a graphical user interface display on the display device depicting a relationship between the current energy state of the aircraft and the operating envelope region.

In yet another embodiment, an aircraft system includes a display device having rendered thereon an engine relight (GUI) display for concurrently depicting an energy state of an aircraft with respect to an operating envelope region for a procedure for starting an engine of the aircraft. The engine relight GUI display includes a first reference axis corresponding to a first parameter, a second reference axis corresponding to a second parameter different from the first parameter, a graphical representation of the operating envelope region associated with the procedure depicted with respect to the first and second reference axes, and aircraft symbology positioned with respect to the first and second reference axes in accordance with current values for the first and second parameters for the aircraft.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
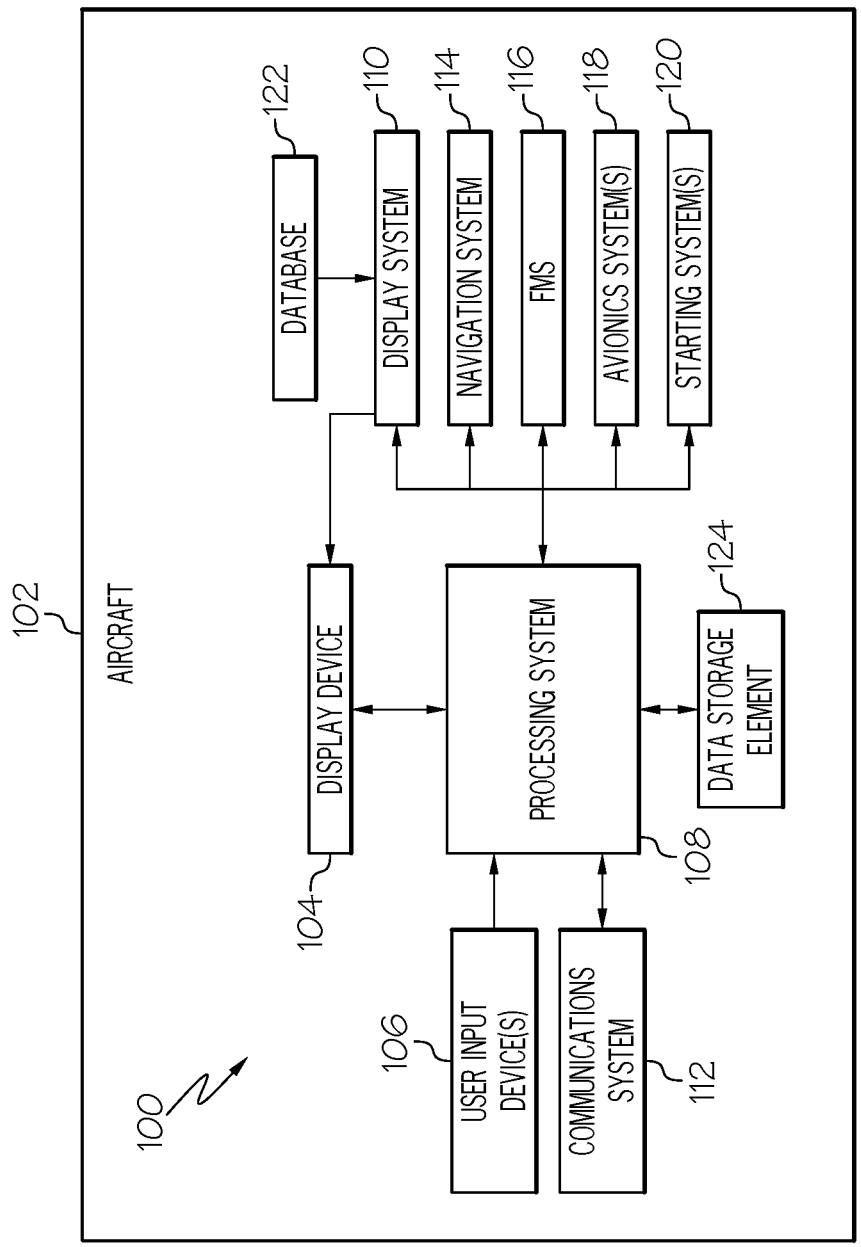
FIG. 1 is a block diagram of a system for an aircraft in an exemplary embodiment.

Embodiments of the subject matter described herein generally relate to systems and methods for facilitating a restart or relight of an engine. While the subject matter described herein could be utilized in various applications or in the context of various types of vehicles (e.g., automobiles, marine vessels, trains, or the like), exemplary embodiments are described herein in the context of aircraft jet engines. Jet engines of an aircraft often support multiple different restart or relight procedures. For example, an unassisted or windmill restart procedure involves a pilot, co-pilot, or other operator restarting the engine when combined altitude and speed result in a mass airflow through the compressor blades that maintains sufficient rotational velocity for enough time to permit restart (e.g., by operating an ignition switch to operate a starter motor). An auxiliary power unit (APU) or starter-assisted restart procedure involves operating the APU or other starting system operating a turbine of the jet engine to provide sufficient intake air for operating the starter motor prior to operating the ignition switch to operate the starter motor. Other starting procedures, such as using engine bleed air alone or in combination with an APU or other starting system, may also be supported, depending on the engine and/or the particular operating conditions.

As described in greater detail below, to facilitate a pilot determining how and when to attempt an engine restart, the current energy state of the aircraft is presented on a graphical user interface (GUI) display that also includes graphical representations of the operating envelope regions for the different restart procedures that may be available for the aircraft. In exemplary embodiments, one reference axis of the GUI display corresponds to a first energy state parameter (e.g., speed) and another reference axis of the GUI display corresponds to a different energy state parameter (e.g., altitude). Graphical representations of the operating envelope regions are provided with respect to the reference axes, and a graphical representation of the aircraft is presented on the GUI display at a position with respect to the reference axes that corresponds to the current real-time energy state of the aircraft (e.g., the current aircraft speed and altitude). Thus, the aircraft symbology indicates, to the pilot, the current energy state of the aircraft with respect to the operating envelope regions and potential restart procedures that may be available as the energy state of the aircraft dynamically changes in real-time. Additionally, when the aircraft symbology is outside the operating envelope region for the desired restart procedure, the pilot may identify how to operate the aircraft to change the energy state (e.g., by adjusting flight control surfaces or other operation of the aircraft to adjust the speed and/or altitude) and intercept or otherwise cross the nearest boundary of the operating envelope region for the desired restart procedure. In this regard, unwitting attempts to initiate restart while the aircraft is outside the operating envelope region may be avoided, thereby avoiding potentially undesirable consequences.

FIG. 1 depicts an exemplary embodiment of a system 100 which may be located onboard a vehicle, such as an aircraft 102. The illustrated aircraft system 100 includes, without limitation, a display device 104, a user input device 106, a processing system 108, a display system 110, a communications system 112, a navigation system 114, a flight management system (FMS) 116, one or more avionics systems 118, one or more starting systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104. For example, as described in greater detail below, a navigational map that includes a graphical representation of the aircraft 102 and one or more of the terrain, meteorological conditions, airspace, air traffic, navigational reference points, and a route associated with a flight plan of the aircraft 102 may be displayed, rendered, or otherwise presented on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches.

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the starting system(s) 120 generally represent the component(s) of the aircraft 102 that are operable to assist starting one or more engines of the aircraft 102. For example, the starting system 120 may include or otherwise be realized as an APU, a starter motor or other electric motor, an ignition system, a fuel injection system, and/or a suitable combination thereof. The starting system 120 may be operable to initiate rotation of a shaft of the engine to draw air into the engine's compression chamber to support combustion or lighting the engine. For a starter-assisted start of the engine, an APU or motor associated with the starting system 120 is operated to rotate the shaft of the engine to provide sufficient air flow for combustion within the combustion chamber, at which point, the ignition system is activated to ignite fuel within the combustion chamber, and thereby, light the engine. For a windmill restart of the engine, the ignition system is operated when the speed and altitude of the aircraft 102 provides sufficient air flow to enable combustion within the combustion chamber.

As described in greater detail below, in exemplary embodiments, the processing system 108 includes or otherwise accesses a data storage element 124 (or database), which maintains information regarding the operating envelope regions for the different starting procedures for the jet engines of the aircraft 102. For example, the data storage element 124 may maintain an association between a respective procedure and the boundary points that limit or otherwise define the envelope region within which the procedure may be safely and effectively performed. That said, in other embodiments, the communications system 112 may be utilized to retrieve or otherwise obtain starting procedure information from an external source (e.g., a remote server or database via a communications network).

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag (EFB) that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
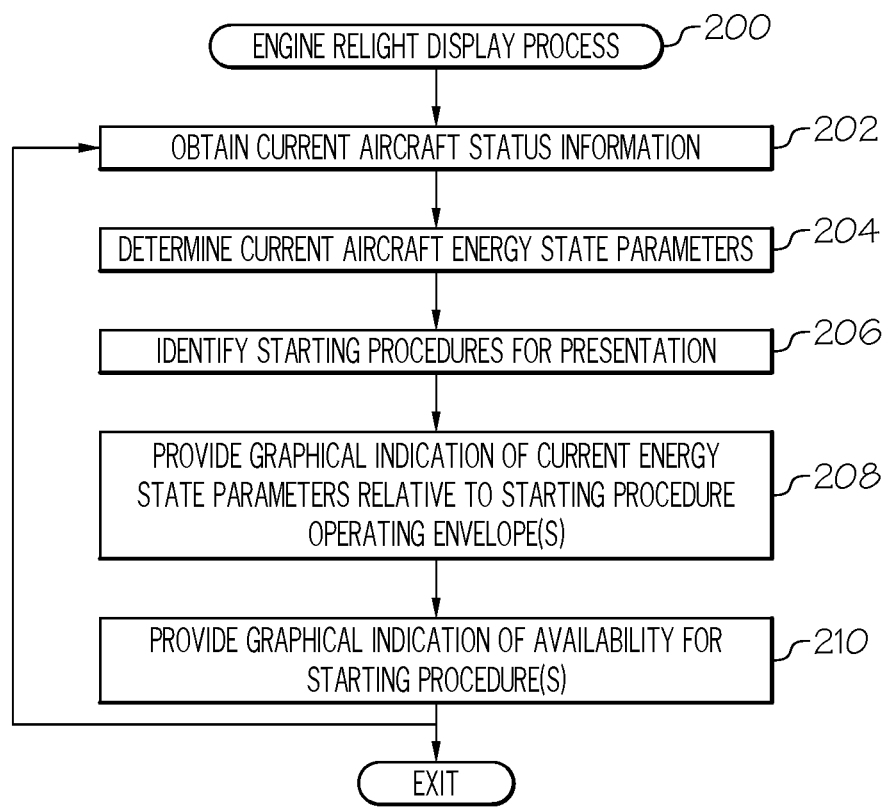
FIG. 2 is a flow diagram of an exemplary engine relight display process suitable for use with the aircraft in the system of FIG. 1 in accordance with one or more embodiments.

Referring now to FIG. 2, in an exemplary embodiment, the aircraft system 100 is configured to support an engine relight display process 200 to display, present, or otherwise provide graphical indicia facilitating relight or restart of an engine and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the engine relight display process 200 may be performed by different elements of the system 100, such as, the processing system 108, the display system 110, the communications system 112, the navigation system 114, the FMS 116, the onboard avionics systems 118 and/or the starting system(s) 120. It should be appreciated that the engine relight display process 200 may include any number of additional or alternative tasks, the tasks need not be performed in the illustrated order and/or the tasks may be performed concurrently, and/or the engine relight display process 200 may be incorporated into a more comprehensive procedure or process having additional functionality not described in detail herein. Moreover, one or more of the tasks shown and described in the context of FIG. 2 could be omitted from a practical embodiment of the engine relight display process 200 as long as the intended overall functionality remains intact.

The illustrated engine relight display process 200 begins by obtaining current status information pertaining to the aircraft and identifying or otherwise determining one or more current aircraft energy state parameters (tasks 202, 204). As described above, the processing system 108 may obtain (e.g., from FMS 116, navigation system 114 and/or other avionic systems 118) the current location of the aircraft 102, the current altitude (or above ground level) of the aircraft 102, the current heading (or bearing) of the aircraft 102, the current amount of fuel remaining onboard the aircraft 102, the current engine status, the current aircraft configuration (e.g., the current flap configuration), and/or other instantaneous, real-time or recent values for one or more parameters that quantify the current operation of the aircraft 102. The processing system 108 identifies or determines one or more current aircraft energy state parameter values using the current aircraft status information obtained from the onboard system(s) 114, 116, 118, such as, for example, the current aircraft speed value, the current aircraft altitude value, and/or the like.

The engine relight display process 200 also identifies or otherwise determines starting procedures to be presented for consideration (task 206). In one or more exemplary embodiments, by default, all potential starting procedures are identified for presentation, with GUI display including selectable GUI elements (e.g., buttons, checkboxes, or the like) that allow a user to selectively remove different starting procedures from the GUI display.

Still referring to FIG. 2, the engine relight display process 200 continues by generating or otherwise providing a graphical indication of the aircraft's current energy state with respect to the operating envelope regions for the identified starting procedures to be depicted (task 208). Additionally, in one or more exemplary embodiments, the engine relight display process 200 generates or otherwise provides graphical indication of the current or anticipated availability of one or more starting procedures (task 210), as described in greater detail below in the context of FIGS. 5-6. The engine relight display process 200 may continually repeat during presentation of an engine relight GUI display to dynamically update the depiction of the aircraft's current energy state with respect to the operating envelope regions as the aircraft travels, or to dynamically add or remove operating envelope regions from the engine relight GUI display in response to a pilot or other user selecting or deselecting a particular starting procedure for presentation.

Figure 3:
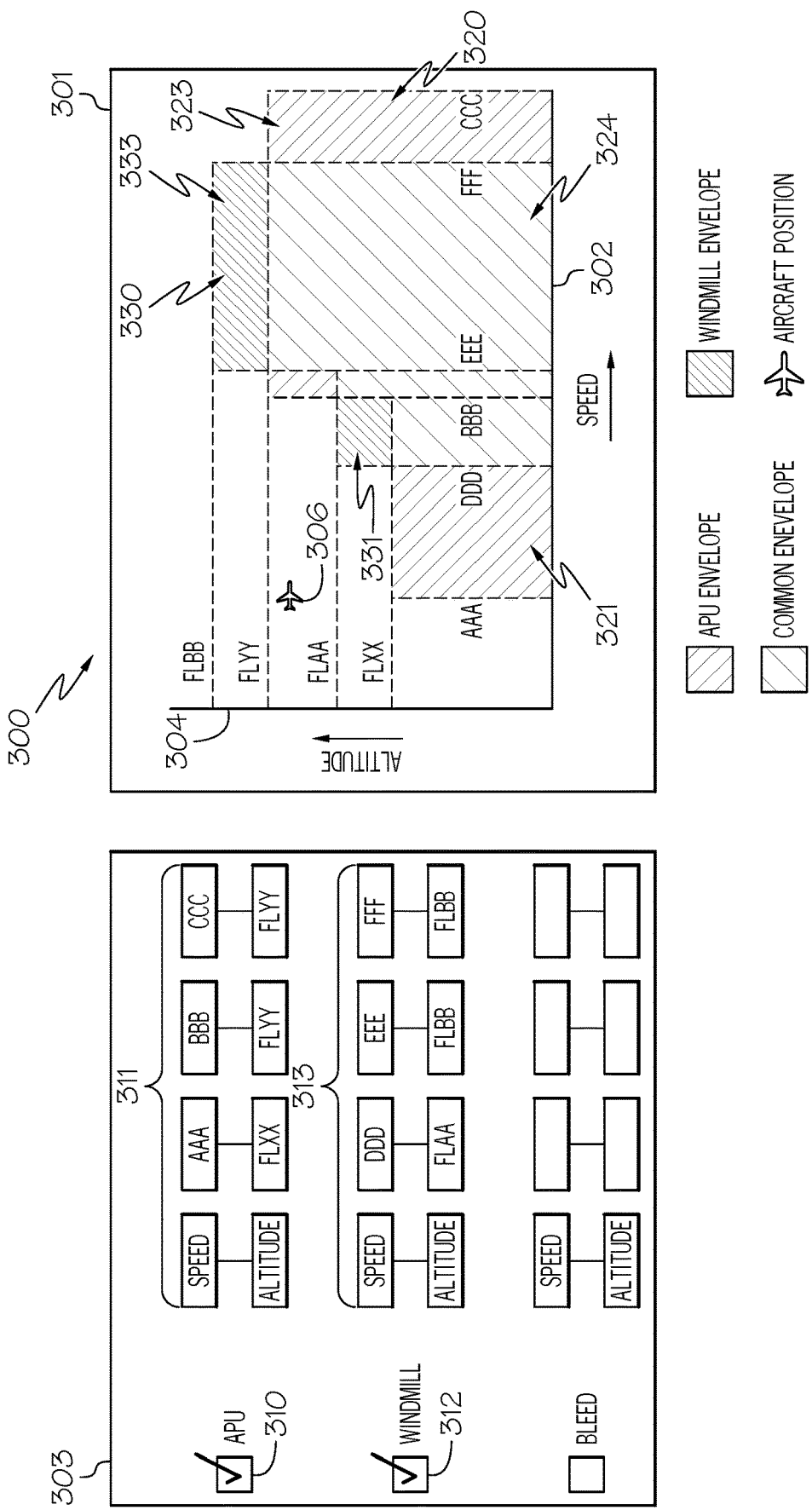
FIGS. 3-5 depict exemplary engine relight graphical user interface (GUI) displays including graphical indicia of the current energy state of the aircraft suitable for presentation on a display device in the aircraft system of FIG. 1 in conjunction with the engine relight display process of FIG. 2 in accordance with one or more embodiments.

FIG. 3 depicts an exemplary embodiment of an engine relight GUI display 300 that may be presented on a display device 104 onboard an aircraft 102 in connection with the engine relight display process 200 of FIG. 2. A right panel 301 of the illustrated engine relight GUI display 300 includes a two-dimensional graph depicting the aircraft energy state. In the illustrated embodiment, a horizontal reference axis 302 corresponds to speed and a vertical reference axis 304 corresponds to altitude. Aircraft symbology 306 is presented on the engine relight GUI display 300 at a horizontal position with respect to the horizontal reference axis 302 that corresponds to the current speed of the aircraft 102, while the vertical position of the aircraft symbology 306 with respect to the vertical reference axis 304 corresponds to the current altitude of the aircraft 102.

A left panel 303 of the engine relight GUI display 300 includes selectable GUI elements 310, 312 associated with different procedures for restarting an engine of the aircraft 102, with graphical representations of the operating envelope regions associated with the respective starting procedures being depicted in the graph region 301 when the respective GUI element 310, 312 is selected. In this regard, FIG. 3 depicts an embodiment where the GUI element 310 associated with the APU-assisted starting procedure and the GUI element 312 associated with the windmill starting procedure are both selected or activated concurrently. The left panel 303 also includes information regions 311, 313 associated with the respective GUI elements 310, 312 that graphically depict the boundary points that define the operating envelope region for the respective starting procedure, with the graphical representations 320, 330 of the operating envelope regions in the graph region 301 corresponding to the depicted boundary points.

For example, the APU-assisted procedure information region 311 indicates that the APU-assisted starting procedure may be performed at or above a lower speed limit ("AAA") and at or below a first altitude limit ("FLXX") until reaching an intermediate higher speed ("BBB"), at which point the procedure becomes available at or below a higher altitude limit ("FLYY") until reaching an upper speed limit ("CCC"). The graphical representation 320 of the APU-assisted starting procedure operating envelope region includes a first portion 321 having an edge aligned at a position with respect to the speed reference axis 302 corresponding to the lower speed limit ("AAA") for the APU-assisted procedure and a height or vertical dimension with respect to the altitude reference axis 304 that corresponds to the lower altitude limit ("FLXX") for the APU-assisted procedure. The portion 321 of the APU-assisted operating envelope region 320 extends from the edge aligned with the lower speed limit to an intermediate position with respect to the speed reference axis 302 corresponding to the intermediate speed ("BBB") while maintaining a height or vertical dimension corresponding to the lower altitude limit ("FLXX"). A second portion 323 of the APU-assisted operating envelope region 320 has a height or vertical dimension with respect to the altitude reference axis 304 that corresponds to the upper altitude limit ("FLYY") and extends horizontally from the intermediate position to an edge aligned at a position with respect to the speed reference axis 302 corresponding to the upper speed limit ("CCC") for the APU-assisted procedure.

Similarly, the graphical representation 330 of the windmill starting procedure operating envelope region includes a first portion 331 having an edge aligned at a position with respect to the speed reference axis 302 corresponding to a lower speed limit ("DDD") for the windmill procedure and a height or vertical dimension with respect to the altitude reference axis 304 that corresponds to the lower altitude limit ("FLAA") for the windmill procedure. The portion 331 of the windmill operating envelope region 330 extends from the edge aligned with the lower speed limit to an intermediate position with respect to the speed reference axis 302 corresponding to the intermediate speed ("EEE") for the windmill procedure while maintaining a height or vertical dimension corresponding to the lower altitude limit ("FLAA"). A second portion 333 of the windmill operating envelope region 330 has a height or vertical dimension with respect to the altitude reference axis 304 that corresponds to the upper altitude limit ("FLBB") for the windmill procedure and extends horizontally from the intermediate position to an edge aligned at a position with respect to the speed reference axis 302 corresponding to the upper speed limit ("FFF") for the windmill procedure.

In exemplary embodiments, the operating envelope regions 320, 330 are rendered using one or more different visually distinguishable characteristics to enable a pilot or other user to differentiate between the operating envelope regions 320, 330 for the different procedures. For example, the APU-assisted operating envelope region 320 may be rendered using a color or fill that is different or otherwise visually distinguishable from the color or fill used to render the windmill operating envelope region 330. In exemplary embodiments, a portion 324 where the operating envelope regions 320, 330 overlap may be rendered or otherwise presented using another visually distinguishable characteristic that is different from the non-overlapping portions of the operating envelope regions 320, 330, thereby allowing a pilot or other user to identify the range of aircraft energy states where either starting procedure may be utilized. For example, the overlapping portion 324 may be rendered using a fill pattern that indicates or otherwise conveys an overlap of the operating envelope regions 320, 330.

As described above, the pilot may utilize the engine relight GUI display 300 to determine whether or how to operate the aircraft 102 to facilitate restarting the engine. For example, based on the relationship between the aircraft symbology 306 and the operating envelope regions 320, 330, the pilot may identify the quickest or fastest way to achieve restart is by descending from the current aircraft altitude. As the aircraft 102 descends and the speed correspondingly increases, the positioning of the aircraft symbology 306 is dynamically updated with respect to the reference axes 302, 304 and the displayed operating envelope regions 320, 330, thereby allowing the pilot to identify when and how to perform the restart once the aircraft symbology 306 reaches, intercepts, or otherwise crosses a boundary of one of the operating envelope regions 320, 330. In some embodiments, the engine relight GUI display 300 may dynamically update in real-time to provide a notification or other graphical indication that an engine restart procedure may now be performed in response to detecting or otherwise identifying the current aircraft energy state is within an operating envelope region 320, 330. For example, a selectable GUI element may be provided on the engine relight GUI display 300 in response to crossing or entering into an operating envelope region, that, when selected, commands, signals, or otherwise instructs the starting system(s) 120 onboard the aircraft 102 to attempt to restart or relight the engine in response to selection of the GUI element. Additionally, as described in greater detail below, in some embodiments, when the aircraft symbology 306 is outside the displayed operating envelope regions 320, 330, the engine relight GUI display 300 may provide graphical indicia of when a particular starting procedure is expected to become available and/or provide a recommendation for how to operate the aircraft 102 to achieve availability of a particular starting procedure.

Figure 4:
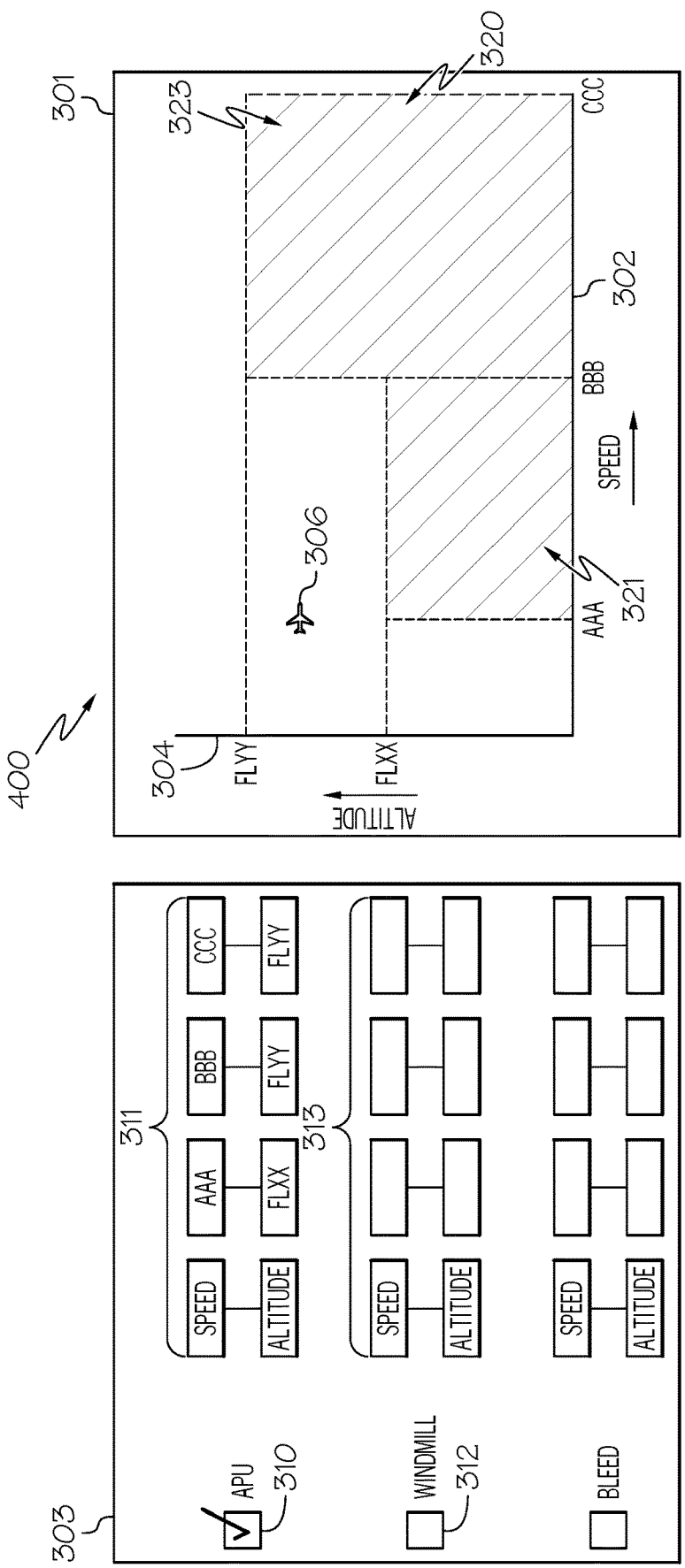

FIG. 4 depicts an updated engine relight GUI display 400 in response to deselection of the windmill procedure checkbox 312. In response to a pilot or other user deselecting the windmill procedure checkbox 312, the windmill operating envelope region 330 is removed from the graph region 301 and the corresponding boundary criteria for the windmill starting procedure are removed from the windmill information region 313 to declutter the engine relight GUI display 400 or otherwise reduce any likelihood of confusion that could otherwise arise from presentation of extraneous or unnecessary information. Additionally, in some embodiments, the scale of the reference axes 302, 304 in the graph region 301 may be dynamically updated to better fit the depicted operating envelope region 320 for the currently selected procedure.

Figure 5:
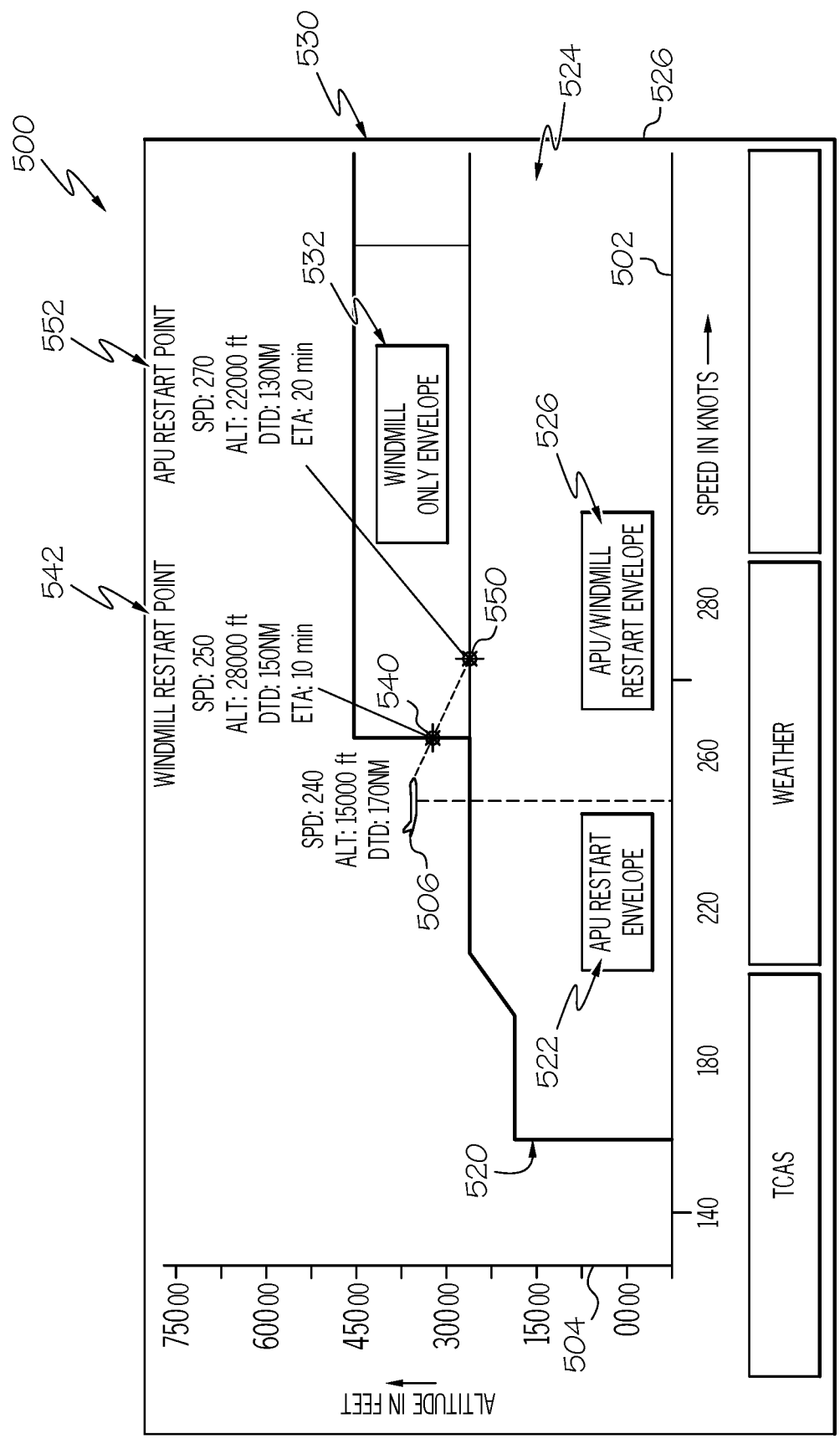

FIG. 5 depicts an exemplary embodiment of an engine relight GUI display 500 that suitable for presentation on a display device 104 onboard an aircraft 102 in lieu of a vertical profile display or vertical situation display of the flight plan. For example, in response to an engine flameout event, a GUI element may be displayed or enabled within a vertical profile display of the planned flight plan route to enable the pilot to temporarily switch the display to the engine relight GUI display 500 to facilitate an engine restart. Similar to the GUI displays 300, 400 of FIGS. 3-4, the horizontal reference axis 502 corresponds to speed and the vertical reference axis 504 corresponds to altitude, with aircraft symbology 506 depicted at a position with respect to the axes 502, 504 corresponding to the current altitude and speed of the aircraft 102. Additionally, the engine relight GUI display 500 includes graphical representations 520, 530 of operating envelope regions for different restart procedures depicted with respect to the reference axes 502, 504. Similar to FIGS. 3-4, non-overlapping portions of the operating envelope regions 520, 530 may be rendered using one or more visually distinguishable characteristics to enable differentiating among the different restart procedures, with the overlapping portion 524 of the operating envelope regions 520, 530 being rendered using another visually distinguishable characteristic that visually indicates multiple restart procedures are available within that range of speed and altitude value combinations. In the illustrated embodiment, text labels 522, 532 are presented within the non-overlapping portions of the operating envelope regions 520, 530 to identify the restart procedure corresponding to the respective operating envelope regions 520, 530, with another label 526 presented within the overlapping portion 524 that indicates both APU-assisted and windmill restart procedures are available within that common portion of the regions 520, 530.

In the illustrated embodiment, when the aircraft symbology 506 is outside one or more of the operating envelope regions 520, 530, the engine relight display process 200 provides graphical indicia of the anticipated availability for the different procedures. For example, the processing system 108 and/or FMS 116 may calculate or otherwise determine an idle descent path for the aircraft 102 initialized with the current altitude and speed, and then identify or otherwise determine a timing and/or location for when the aircraft 102 is likely to reach a boundary of a respective operating envelope region 520, 530 assuming that idle descent path. In this regard, the processing system 108 and/or FMS 116 identifies or otherwise determines when the idle descent path achieves a combination of estimated speed and altitude values that is within an operating envelope region and then provides graphical indication of that speed and altitude combination on the engine relight GUI display 500. For example, one or more graphical indicia 550 may be rendered at a point with respect to the reference axes 502, 504 that corresponds to the estimated speed and altitude values for when the aircraft 102 is expected to enter the windmill operating envelope region 530 given an idle descent from the current state of the aircraft 102 represented by the position of the aircraft symbology 506. Similarly, graphical indicia 560 may also be rendered at the point with respect to the reference axes 502, 504 that corresponds to the estimated speed and altitude values for when the aircraft 102 is expected to enter the APU-assisted operating envelope region 520 from the current state of the aircraft 102. Additionally, textual information 542, 552 may be presented in connection with the estimated procedure availability points 540, 550, such as, for example, identification of the starting procedure that will be available at that respective point 540, 550, the estimated speed and/or altitude at that respective point 540, 550, the estimated time of arrival or estimated travel time required for reaching that respective point 540, 550, and the like.

Still referring to FIG. 5, the pilot may utilize the spatial relationship between the aircraft symbology 506 and the estimated procedure availability points 540, 550, the estimated travel time, and/or other information 542, 552 associated with the estimated procedure availability points 540, 550 to determine whether and how to operate the aircraft 102 to enable a desired procedure for restarting the engine. For example, based on the travel time difference between the windmill availability point 540 and the APU-assisted availability point 550, the pilot may decide to initiate a windmill restart upon reaching the windmill availability point 540 or delay attempting a restart until reaching the APU-assisted availability point 550 and/or APU-assisted operating envelope region 520.

Figure 6:
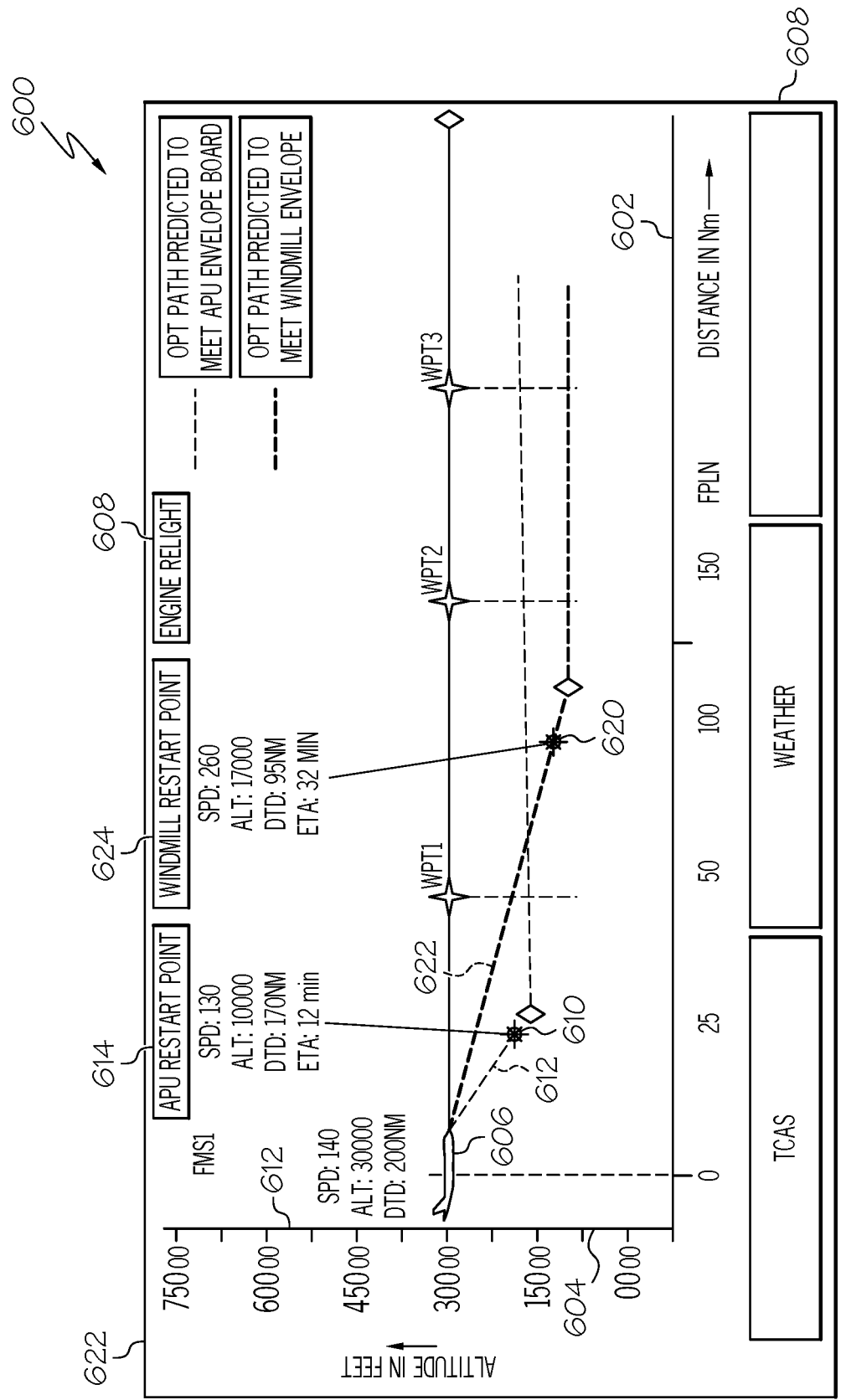
FIG. 6 depicts an exemplary vertical profile GUI display including graphical indicia of estimated availability points for performing different relight procedures suitable for presentation on a display device in the aircraft system of FIG. 1 in conjunction with the engine relight display process of FIG. 2 in accordance with one or more embodiments.

FIG. 6 depicts an embodiment of a vertical profile GUI display 600 that includes graphical indicia 610, 620 of estimated availability points for different starting procedures (e.g., task 210). In the vertical profile GUI display 600, the horizontal reference axis 602 corresponds to distance and the vertical reference axis 604 corresponds to altitude, with aircraft symbology 606 depicted at or near the left edge of the horizontal reference axis 602 at a position with respect to the vertical axis 604 corresponding to the current altitude of the aircraft 102. In response to an engine flameout event, a GUI element 608 may be enabled or provided that is selectable by a pilot or other user to initiate presentation of the estimated procedure availability points 610, 620 with respect to the reference axes 602, 604.

To identify or otherwise determine the locations of the estimated procedure availability points 610, 620, the processing system 108 and/or FMS 116 calculates or otherwise determines a flight path for reaching a boundary of the respective operating envelope region for a particular starting procedure from the current energy state of the aircraft 102. For example, based on the current aircraft altitude and speed, the processing system 108 and/or FMS 116 calculates or otherwise determines a flight path that reaches a boundary of the APU-assisted operating envelope region that minimizes travel time, fuel required, cost index, or some other optimization criteria. Thereafter, the processing system 108 and/or FMS 116 generates or otherwise provides a graphical representation 612 of the identified optimized flight path for reaching that estimated availability point 610 on the boundary of the APU-assisted operating envelope region. In this regard, the horizontal distance between the aircraft symbology 606 and the APU-assisted procedure availability point 610 with respect to the horizontal axis 602 corresponds to the amount of distance required to travel before the APU-assisted restart is available, and the vertical distance between the aircraft symbology 606 and the APU-assisted procedure availability point 610 with respect to the vertical axis 604 corresponds to the amount of altitude required to descend to achieve an aircraft energy state within the APU-assisted operating envelope region. Similarly, based on the current aircraft altitude and speed, the processing system 108 and/or FMS 116 calculates or otherwise determines a flight path that reaches a boundary of the windmill operating envelope region, and then generates or otherwise provides a graphical representation 622 of the identified optimized flight path for reaching that estimated availability point 620 on the boundary of the windmill operating envelope region. As described above in the context of FIG. 5, textual information 614, 624 may be presented in connection with the estimated procedure availability points 610, 620, such as, for example, the estimated speed and/or altitude at that respective point 610, 620, the estimated time of arrival or estimated travel time required for reaching that respective point 610, 620, the estimated amount of distance required for reaching that respective point 610, 620, and the like.

By graphically depicting the estimated procedure availability points 610, 620 and corresponding recommended flight paths 612, 622 thereto, and depicting them concurrently to the planned flight path, the pilot or other aircraft operator may make a more informed decision as to which procedure the pilot would prefer to perform based on the current situation and how to fly the aircraft to achieve that procedure. For example, if meteorological conditions at or near the current location of the aircraft makes a more rapid descent such as that depicted by flight path 612 inadvisable, the pilot may determine to execute flight path 622 in pursuit of a windmill restart with more favorable meteorological conditions. Conversely, if forecasted meteorological conditions at or near the windmill procedure availability point 620 are disadvantageous, the pilot may choose to pursue the flight path 612 towards the APU-assisted procedure availability point 610. Similarly, some embodiments of the vertical profile GUI display 600 may include graphical representations of airspace restrictions, air traffic, terrain and/or obstacles, or potential other information that may further assist or guide the pilot in identifying the appropriate restart procedure to pursue and the corresponding manner for safely operating the aircraft to enable that procedure. Additionally, as described above, the estimated availability points 610, 620 and flight paths 612, 622 may dynamically update in response to changes to the aircraft energy state to allow the pilot to continually assess the situation and alter operation of the aircraft as needed in real-time to achieve a desired outcome.

Figure 7:
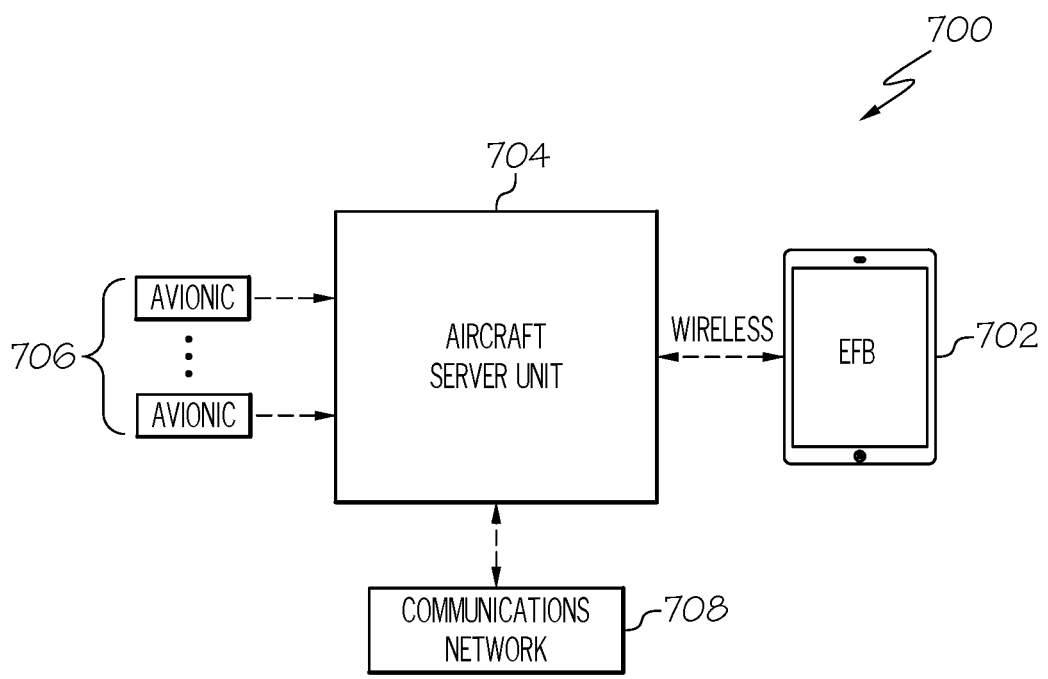
FIG. 7 depicts an exemplary embodiment of an electronic flight bag (EFB) system suitable for implementing the engine relight display process of FIG. 2 in conjunction with the aircraft system of FIG. 1 in accordance with one or more embodiments.

FIG. 7 depicts an exemplary embodiment of an electronic flight bag (EFB) system 700 suitable for implementing the subject matter described herein. The EFB system includes an electronic device 702 (alternatively referred to as the EFB) that is communicatively coupled to a host device 704 that is communicatively coupled to one or more of the avionics systems 706 onboard an aircraft (e.g., avionics systems 112, 114, 116, 118, 120). The host device 704 generally represents a computer system configured support the engine relight display process 200 described herein and provide corresponding engine relight GUI displays on the electronic device 702, and for purposes of explanation, but without limitation, the host device 704 is referred to herein as a server unit (or server). In this regard, the host server 704 includes at least a processing system (e.g., processing system 108) and/or other hardware computing resources along with one or more data storage elements (or memory) capable of storing instructions, that, when read and executed by the processing system, cause the host server 704 to generate or otherwise support the engine relight display process 200. The host server 704 may also be coupled to a communications network 708, which may be utilized to receive data and/or information in conjunction with the engine relight display process 200 and/or to support communications with the electronic device 702.

In exemplary embodiments, the electronic device 702 is realized as a laptop or notebook computer, a tablet computer, or another suitable computing device configured to provide EFB-functionality, and accordingly, the electronic device 702 is alternatively referred to herein as an EFB. The EFB 702 includes at least a display device (e.g., display device 104) and a processing system (e.g., processing system 108 and/or display system 110), a data storage element (or memory) configured to support generating energy management GUI displays as described herein. In various situations, the EFB 702 may be subject to regulations or restrictions that limit the use of the EFB 702 or the type or content of information presented thereon (e.g., no tactical information may be presented, etc.).

In one or more embodiments, a pilot of the aircraft utilizes the EFB 702 to initiate the engine relight display process 200 described above. That said, in other embodiments, the engine relight display process 200 may automatically be initiated by the FMS 116 or other onboard avionics in response to identifying engine flameout. The server 704 accesses the avionics systems 706 and/or the communications network 708 to receive or otherwise obtain the current aircraft state information, such as the current position of the aircraft, the current altitude of the aircraft, the current speed of the aircraft, the current amount of fuel remaining onboard the aircraft, the meteorological information pertaining to the current aircraft position, and the like. Thereafter, the server 704 may provide indication of the relative energy state parameters or attributes to the EFB 702, which, in turn, generates or otherwise provides an engine relight GUI display on the display of the EFB 702. Thus, the pilot may utilize the EFB 702 to monitor the current aircraft energy state and operate the aircraft to manage energy accordingly to achieve the desired engine relight procedure and/or conditions for performing the relight procedure.

In some embodiments, the engine relight displays described herein do not present the aircraft speed, altitude, or other parameters characterizing attributes of the current energy state in absolute terms, but rather, relatively to the operating envelope regions. Accordingly, any axes, scales, or the like that are presented on the engine relight displays may be presented without labels or other indicia of absolute values associated therewith. By decluttering and reducing the amount of symbology or text presented, the amount of time required to perceptibly process and mentally orient oneself with the display may be reduced, thereby helping a pilot maintain situational awareness with respect to operating the aircraft while also being able to quickly glean relevant information from the display within a limited amount of time.

It should be noted that the subject matter described herein is not necessarily limited to use on or with any particular type of display device. Additionally, the subject matter described herein is not limited two-dimensional displays. For example, the GUI displays 500, 600 of FIG. 5-6 may be combined to provide a three-dimensional engine relight GUI display that includes a vertical reference axis corresponding to altitude (e.g., the z-axis) and a pair of reference axes in a horizontal plane (e.g., the x- and y-axes) corresponding to distance and speed. Thus, the APU-assisted procedure availability point may be positioned with respect to the altitude and speed axes at a point with respect to the altitude and speed axes that corresponds to the estimated altitude and speed of the aircraft 102 upon reaching that point, with a distance between that point and the aircraft symbology corresponding to the amount of distance required to travel before the APU-assisted restart is available.

By virtue of the subject matter described herein, a pilot can simultaneously analyze and understand the current aircraft energy state with respect to the different procedures that may be available for restarting an engine and operate the aircraft accordingly. In this regard, the pilot does not need to consult flight manuals or other procedures and mentally identify and map aircraft parameters to the data provided in those flight manuals or procedures, while simultaneously being engaged in other tasks for safely operating the aircraft (e.g., communicating with air traffic control, assessing the current situation, and/or the like). Additionally, the pilot does not need to perform numerous adjustments to a display (e.g., changing displays, changing the scales of the displays, or performing other manual adjustments to the displays) to obtain information relevant to performing a restart procedure.

For the sake of brevity, conventional techniques related to jet engines, APUs, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of presenting an energy state associated with an aircraft on a graphical user interface display, the method comprising:
    providing, on a display device onboard the aircraft, the graphical user interface display comprising a first reference axis corresponding to a first energy state parameter and a second reference axis corresponding to a second energy state parameter different from the first energy state parameter;
    providing, on the graphical user interface display, a graphical representation of an operating envelope region associated with a procedure for starting an engine of the aircraft with respect to the first and second reference axes;
    obtaining, from one or more systems onboard the aircraft, current values for the first and second energy state parameters for the aircraft;
    providing, on the graphical user interface display, a graphical representation of the aircraft positioned with respect to the first and second reference axes based on the current values for the first and second energy state parameters; and
    providing, on the graphical user interface display, a graphical indication of an estimated availability point when the procedure for starting the engine of the aircraft is expected to become available on a boundary of the graphical representation of the operating envelope region associated with the procedure for starting the engine of the aircraft.

2. The method of claim 1, further comprising dynamically updating a position of the graphical representation of the aircraft with respect to the first and second reference axes in response to changes to the current values for the first and second energy state parameters.

3. The method of claim 1, further comprising providing, on the graphical user interface display, a graphical representation of a second operating envelope region associated with the engine of the aircraft with respect to the first and second reference axes, wherein the second operating envelope region is different from the operating envelope region.

4. The method of claim 3, further comprising identifying selection of a graphical user interface element on the graphical user interface display associated with a starting procedure associated with the second operating envelope region, wherein providing the graphical representation of the second operating envelope region comprises adding the graphical representation of the second operating envelope region to the graphical user interface display concurrently to the graphical representation of the operating envelope region in response to selection of the graphical user interface element.

5. The method of claim 3, further comprising:
    identifying selection of a graphical user interface element on the graphical user interface display associated with a starting procedure associated with the second operating envelope region; and
    removing the graphical representation of the second operating envelope region from the graphical user interface display in response to selection of the graphical user interface element.

6. The method of claim 3, wherein the operating envelope region is associated with one of a windmill procedure and a starter-assisted procedure and the second operating envelope region is associated with an other of the windmill procedure and the starter-assisted procedure.

7. The method of claim 3, wherein the operating envelope region comprises one of a starter-assisted relight operating envelope region and a windmill relight operating envelope region and the second operating envelope region comprises the other of the starter-assisted relight operating envelope region and the windmill relight operating envelope region.

8. The method of claim 3, further comprising rendering overlapping portions of the operating envelope region and the second operating envelope region using a graphical characteristic that is visually distinguishable from nonoverlapping portions of the operating envelope region and the second operating envelope region.

9. The method of claim 1, wherein the first energy state parameter comprises speed and the second energy state parameter comprises altitude.

10. The method of claim 1, further comprising determining the estimated availability point on the boundary of the operating envelope region based on the current values for the first and second energy state parameters.

11. The method of claim 1, further comprising providing, on the graphical user interface display, a graphical representation of a flight path between the graphical representation of the aircraft and the estimated availability point.

12. The method of claim 1, further comprising determining a flight path that minimizes an optimization criterion for reaching the boundary of the operating envelope region to identify a location of the estimated availability point.

13. The method of claim 1, further comprising determining an idle descent path for the aircraft initialized with the current values for the first and second energy state parameters to identify a location of the estimated availability point comprising when the aircraft is likely to reach the boundary given the idle descent path.

14. The method of claim 1, further comprising providing a graphical representation of a flight path for reaching the estimated availability point on the boundary of the operating envelope region when the graphical representation of the aircraft is outside the operating envelope region.

15. An aircraft system comprising:
  one or more onboard systems to provide current parameter values associated with a current energy state of an aircraft;
  a data storage element to maintain information defining an operating envelope region for a starting procedure for an engine of the aircraft;
  a display device; and
  a processing system coupled to the one or more onboard systems, the data storage element, and the display device to provide a graphical user interface display on the display device depicting a relationship between the current energy state of the aircraft and the operating envelope region, wherein:
    the graphical user interface display comprises aircraft symbology, a graphical representation of the operating envelope region, and a graphical indication of an estimated availability point for when the starting procedure for the engine of the aircraft is expected to become available on a boundary of the graphical representation of the operating envelope region for the starting procedure; and
    the aircraft symbology is positioned with respect to the graphical indication of the estimated availability point in accordance with the relationship between the current parameter values associated with the current energy state of the aircraft and the operating envelope region for the starting procedure.

16. The aircraft system of claim 15, wherein the graphical user interface display comprises:
  a first reference axis corresponding to a first energy state parameter; and
  a second reference axis corresponding to a second energy state parameter different from the first energy state parameter, wherein:
    the graphical representation of the operating envelope region with respect to the first and second reference axes; and
    the aircraft symbology is positioned with respect to the first and second reference axes according to the current parameter values.

17. The aircraft system of claim 16, wherein the processing system is configured to dynamically update a position of the aircraft symbology with respect to the first and second reference axes according to the current parameter values in response to changes to the current parameter values.

18. The aircraft system of claim 16, wherein the first energy state parameter comprises altitude, the second energy state parameter comprises speed, and the current parameter values comprise a current speed of the aircraft and a current altitude of the aircraft.

19. A system comprising a display device having rendered thereon an engine relight (GUI) display for concurrently depicting an energy state of an aircraft with respect to an operating envelope region for a procedure for starting an engine of the aircraft, wherein the engine relight GUI display comprises:
  a first reference axis corresponding to a first parameter;
  a second reference axis corresponding to a second parameter different from the first parameter;
  a graphical representation of the operating envelope region associated with the procedure for starting the engine of the aircraft depicted with respect to the first and second reference axes;
  a graphical representation of an estimated availability point for the procedure for starting the engine of the aircraft determined based on current values for the first and second parameters for the aircraft; and
  aircraft symbology positioned with respect to the first and second reference axes in accordance with the current values for the first and second parameters for the aircraft, wherein the aircraft symbology is outside the graphical representation of the operating envelope region associated with the procedure for starting the engine of the aircraft.

20. The system of claim 19, wherein:
the first parameter comprises altitude;
the second parameter comprises speed; and
a position of the aircraft symbology dynamically updates with respect to the first and second reference axes in response to changes to one or more of an altitude of the aircraft and a speed of the aircraft.

* * * * *